United States Patent
Birke et al.

(12) United States Patent (10) Patent No.: US 10,528,561 B2
(45) Date of Patent: Jan. 7, 2020

(54) DYNAMIC BLOCK INTERVALS FOR PRE-PROCESSING WORK ITEMS TO BE PROCESSED BY PROCESSING ELEMENTS

(71) Applicant: International Business Machines Corporation, Armonk, NY (US)

(72) Inventors: Robert Birke, Zurich (CH); Mathias Bjoerkqvist, Zurich (CH); Martin L. Schmatz, Zurich (CH); Sebastiano Spicuglia, Zurich (CH)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1053 days.

(21) Appl. No.: 14/951,616

(22) Filed: Nov. 25, 2015

(65) Prior Publication Data

US 2017/0147641 A1    May 25, 2017

(51) Int. Cl.
| | | |
|---|---|---|
| *G06F 16/00* | (2019.01) | |
| *G06F 16/2453* | (2019.01) | |
| *G06F 9/50* | (2006.01) | |

(52) U.S. Cl.
CPC ........ *G06F 16/24542* (2019.01); *G06F 9/505* (2013.01)

(58) Field of Classification Search
CPC ........... G06F 17/3046; G06F 17/30442; G06F 17/30463; G06F 16/24542; G06F 9/505
USPC .................................................. 707/713, 715
See application file for complete search history.

(56) References Cited

U.S. PATENT DOCUMENTS

| | | | | |
|---|---|---|---|---|
| 7,716,678 | B2 * | 5/2010 | Herrmann | G06F 9/546 719/313 |
| 2001/0039559 | A1 * | 11/2001 | Eilert | G06F 9/5061 718/104 |
| 2006/0140119 | A1 * | 6/2006 | Yeh | H04L 49/254 370/235 |
| 2006/0212658 | A1 * | 9/2006 | Hrle | G06F 12/0862 711/137 |
| 2014/0129588 | A1 | 5/2014 | Chi et al. | |
| 2014/0351820 | A1 | 11/2014 | Lee | |
| 2015/0074672 | A1 | 3/2015 | Yeddanapudi et al. | |

* cited by examiner

*Primary Examiner* — Monica M Pyo
(74) *Attorney, Agent, or Firm* — Cantor Colburn LLP; Daniel Morris (57) ABSTRACT

Embodiments include pre-processing work items to be processed by computerized processing elements. Aspects include accessing a performance index, which relates to (dynamic) processing performances of work items as processed by the computerized processing elements. Aspects also include determining a time interval (during which the receiver may group queued work items into a block), according to the accessed performance index. Aspects further includes setting a timer to the determined time interval, to allow the receiver to group work items being queued until that time interval has elapsed, according to the timer set. As a result, a block of grouped work items will be obtained, which can then be passed to a scheduler for subsequent processing by computerized processing elements.

17 Claims, 4 Drawing Sheets

DYNAMIC BLOCK INTERVALS FOR PRE-PROCESSING WORK ITEMS TO BE PROCESSED BY PROCESSING ELEMENTS

BACKGROUND

The invention relates in general to the field of computer-implemented methods for pre-processing work items, in a context where work items are being queued for pre-processing by a receiver, which uses a blocking interval to build blocks of work items, which are then passed to a scheduler for subsequent processing.

One also knows cluster computing frameworks. For example, the so-called "Apache Spark" is an open source cluster computing framework, comprising multiple components. Its core components provides distributed task dispatching, scheduling, and basic I/O functionalities. They fundamentally rely on so-called Resilient Distributed Datasets (RDDs), i.e., a logical collection of elements partitioned across machines (nodes) of a cluster, which can be operated on in parallel. Amongst other components, the so-called "Spark Streaming" component (an extension of the core Spark component) enables scalable, fault-tolerant stream processing of live data streams with high-throughput, while enabling streaming analytics. Spark Streaming receives input data streams and divides the data into batches, which batches are then processed to generate a stream of results in batches.

Optimizations are available to minimize the processing time of each batch. Beside the batch period, another parameter to consider is the receiver's blocking interval, which is determined by the configuration parameter spark.streaming.blockInterval and need be set beforehand. I.e., received data are coalesced into blocks of data before being processed. The number of blocks in each batch determines a number of tasks that will be used to process the received data. The number of tasks per receiver per batch is approximately equal to the batch interval divided by the block interval. For example, a block interval of 100 ms results in 10 tasks per 1 second batches. If the number of tasks is too low (i.e., less than the number of cores per machine), subsequent processing is inefficient as not all the available cores are used to process the data.

As an alternative to multiple input streams per receivers, one may repartition the input data stream to distribute received batches of data across a specified number of machines in the cluster before further processing.

SUMMARY

According to a first aspect, the present invention is embodied as a computer-implemented method for pre-processing work items to be processed by computerized processing elements. The method includes three steps, which are performed while work items are being queued in view of pre-processing by a receiver. First, a performance index is accessed, which relates to (dynamic) processing performances of work items as processed by the computerized processing elements. Second, a time interval (during which the receiver may group queued work items into a block) is determined, according to the accessed performance index. Finally, a timer is set to the determined time interval, to allow the receiver to group work items being queued until that time interval has elapsed, according to the timer set. This way, a block of grouped work items will be obtained, which can then be passed to a scheduler for subsequent processing by computerized processing elements.

The accessed performance index may for instance measure a processing performance, by the computerized processing elements, of one or more blocks of work items as previously grouped by the receiver. This index measures a processing latency and/or a processing throughput of the processed blocks. The time interval determined is a dynamic quantity, e.g., it increases (respectively increases) if a load of the processing elements decreases (respectively increases), according to the accessed performance index.

According to another aspect, the invention is embodied as a planner for pre-processing work items. The planner is interfaceable with a receiver and furthermore configured to repeatedly perform steps of: accessing a performance index; determining a time interval and setting a timer accordingly, as described above. The planner may for instance comprise a controller for setting the timer. It may furthermore comprise a load classifier for instructing the scheduler to put on hold or cancel processing of blocks corresponding to optional queries.

According to a final aspect, the invention is embodied as a computer program product, comprising a computer readable storage medium having program instructions embodied therewith, the program instructions executable to cause a planner such as described above to perform steps according to present methods.

BRIEF DESCRIPTION OF THE DRAWINGS

The accompanying drawings show simplified representations of devices or parts thereof, as involved in embodiments. Similar or functionally similar elements in the figures have been allocated the same numeral references, unless otherwise indicated.

DETAILED DESCRIPTION

Referring generally to FIGS. 1-4, an aspect of the invention is first described, which concerns computer-implemented methods for pre-processing work items 52. Eventually, such items are meant to be processed S10 by computerized processing elements 10.

Figure 3:
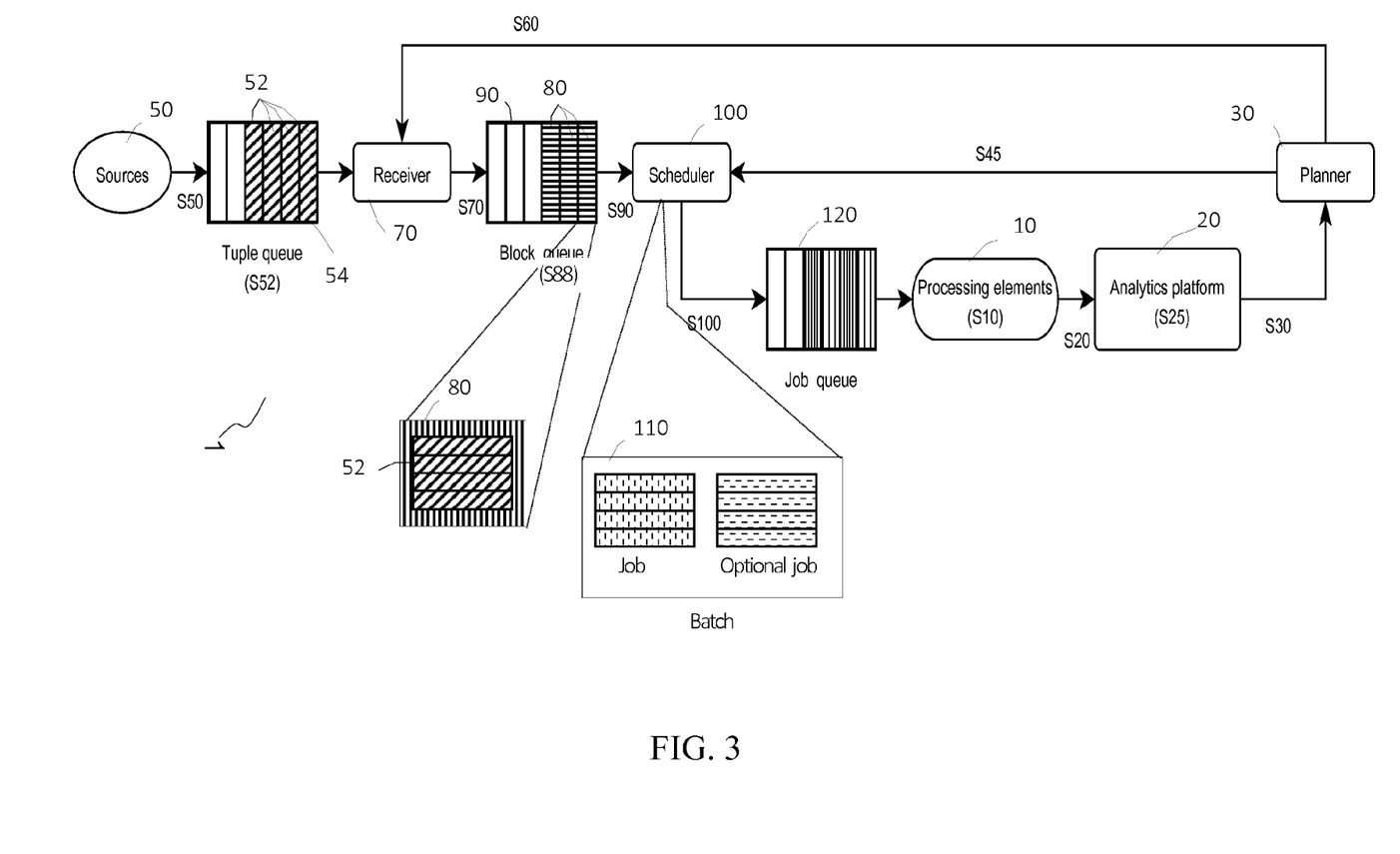
FIG. 3 is a block diagram schematically illustrating selected components of system according to embodiments.
Figure 4:
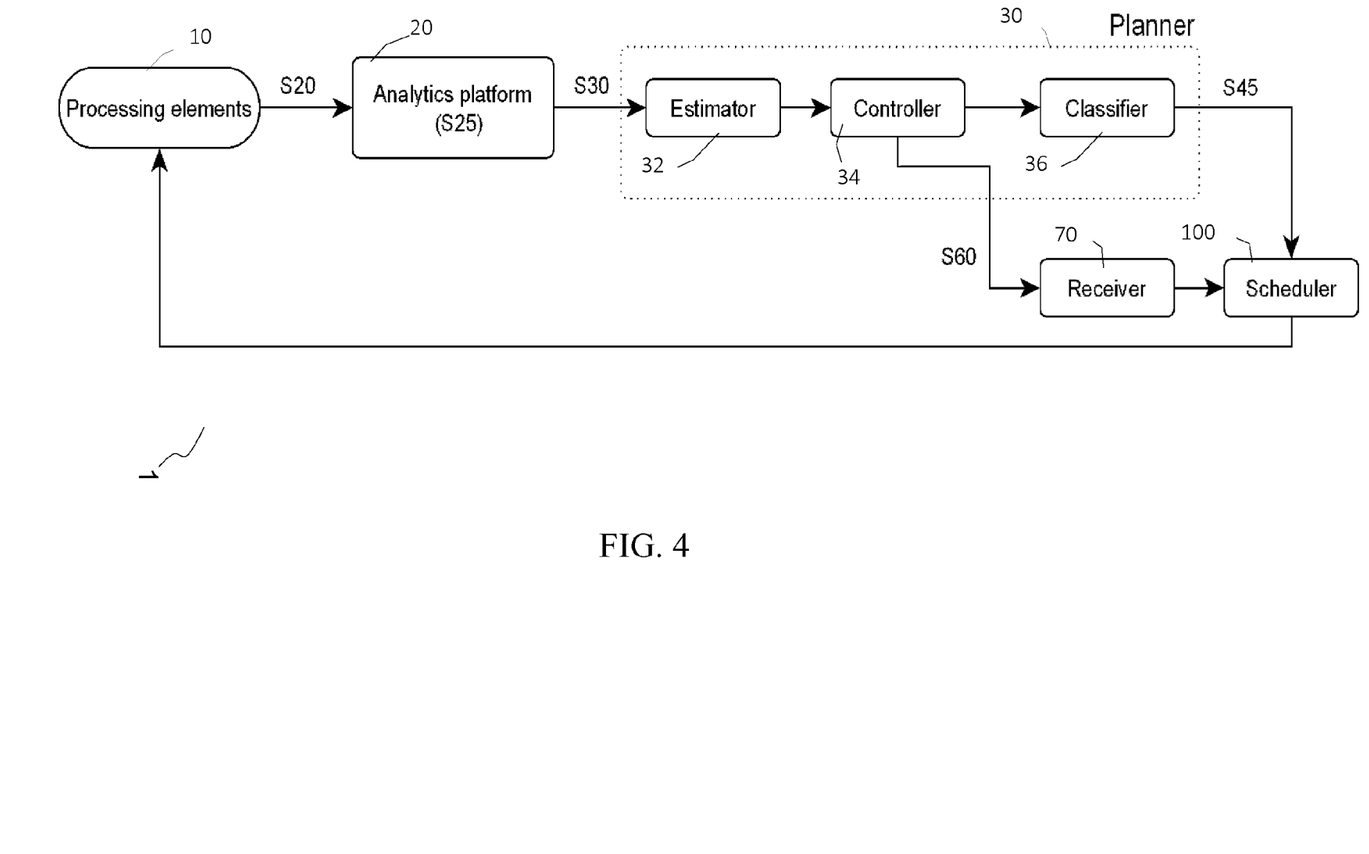
FIG. 4 is a block diagram schematically illustrating selected components of a planner, according to embodiments.

Work items may comprise data, computer processes (e.g., tasks or threads), or more generally any data that can be subject to subsequent processing by the processing elements 10. The work items 52 are streamed, i.e., repeatedly (or continuously) received and queued S52, in view of pre-processing by a receiver 70, as illustrated in FIGS. 3 and 4. In that respect, work items 52 can notably be any data as involved in live data streams, from many different sources, e.g., as ingestible by the Spark Streaming component discussed in the introduction. Work items are queued S52 as a tuple queue, as illustrated in FIG. 3.

Present methods basically revolves around the following three steps, which are repeatedly performed while work items 52 are being queued S52 in view of pre-processing by the receiver 70.

Figure 1:
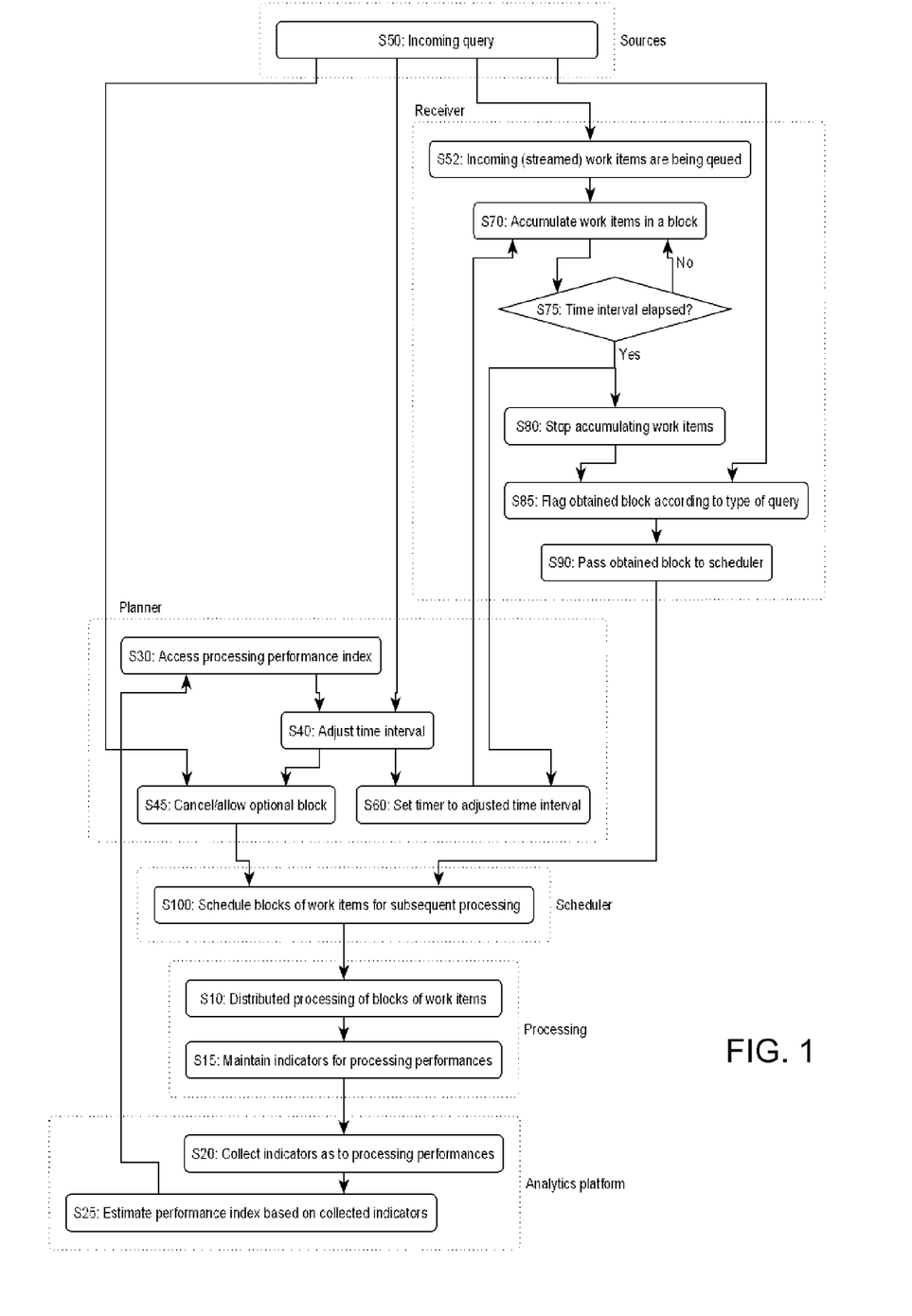
FIG. 1 is a flowchart illustrating high-level steps of a method for pre-processing work items, according to embodiments.

First, a processing performance index is accessed (step S30 in FIG. 1). This performance index is dynamic inasmuch as it is subject to changes. It measures processing performances of work items 52 as actually processed S10 by the computerized processing elements 10. Examples of suitable performance indices are discussed later in detail.

Then, a time interval, or block interval, is determined S40. I.e., this time interval is typically adjusted, that is, modified with respect to a previously determined time interval, as suggested in FIG. 1. A time interval as meant herein is a period of time during which the receiver 70 is allowed to group queued work items 52 into a block 80, as explained below. Time intervals are determined according to the accessed performance index, so as to optimize, or at least improve usage and consumption of processing elements (e.g., CPU cores). Thus, in the present invention, block intervals are not constant parameters, set beforehand. Rather, they are dynamically adapted according to the processing performances.

Finally, a timer is set S60 to the time interval as last determined, to allow the receiver 70 to group S70-S80 work items 52 as they are being queued S52, until that time interval has elapsed, that is, according to the timer set. As a result, a block 80 of grouped work items 52 will be obtained S80, which can be passed S90 to a scheduler 100 for subsequent processing S10 by the computerized processing elements 10.

Present methods can be regarded as implementing a feedback loop mechanism, whereby processing performances are monitored to adaptively modulate block intervals. I.e., by modifying the time interval during which work items are grouped at the receiver 70, one modifies the ratio batch interval/time (block) interval, which in turn impacts utilization of the processing elements (e.g., CPU cores). Thus, thanks to the present methods, the utilization of resources (processing elements 10) can be dynamically improved, possibly optimized, by dynamically adapting the block intervals according to the performance measures accessed. Eventually, present methods allow job latencies to be improved, although additional criteria may be taken into account, as explained below.

In addition, embodiments as discussed below allows multiple types of (concurrent) queries to be prioritized in real-time data processing systems, according to priority and latency targets encompassed in the queries.

The processing performance index is now discussed in detail. Such an index refers to actual processing performances of the processing elements 10, as actually measured by (or measurable from) the system 1, FIGS. 3, 4. To that aim, advantage can be taken of an analytics platform 20, as, e.g., present in a Spark environment.

The processing performance index may be estimated using any suitable processing performance metric, which may include processing latency and/or a processing throughput of processed blocks. Such metrics are themselves impacted by lower-level metrics such as response times, capacities and/or latencies of individual processing elements 10. Lower-level metrics may also be directly considered to estimate processing performances. More generally, diverse criteria such as completion times, bandwidth, throughputs, relative efficiency, scalability, performance per watt, etc., may be taken into account. In all cases, the processing performance index is dynamically assessed and subject to changes, owing to the continuously changing tuples being queued, especially in big data processing systems.

The accessed S30 performance index measures processing performances of items that were previously processed, e.g., performances of blocks 80 of work items 52 that were previously grouped S70-S80 by the receiver 70 and passed to the scheduler for actual processing. That is, the feedback pertains to items that were already processed at the time where a current block 80 is being formed, as seen from the logic of the flow chart of FIG. 1. Thus, the shorter the feedback, the tighter the optimization. Better results will therefore be obtained in a framework offering capability to perform streaming analytics, e.g., where an analytics platform is closely integrated with processing elements.

The performance index shall typically be estimated S25 based on indicators collected S20 from the processing elements 10. Such operations are typically done by the processing elements 10 themselves, by an analytics platform 20, the environment permitting. To that aim, processing elements 10 may locally maintain S15 all necessary indicators. Note that steps S25 and S30 may be asynchronously carried out. E.g., an analytics platform 20 may update the performance index based on inputs collected from the nodes 10, upon jobs completions (and at a non-deterministic rate), whereas the planner 30 may access this index at a constant frequency. The latter may for instance be set according to a minimal block interval supported by the system, if any (e.g., to 20 Hz, that is, 1/50 ms, corresponding to the minimal recommended block interval in Spark systems).

Figure 2:
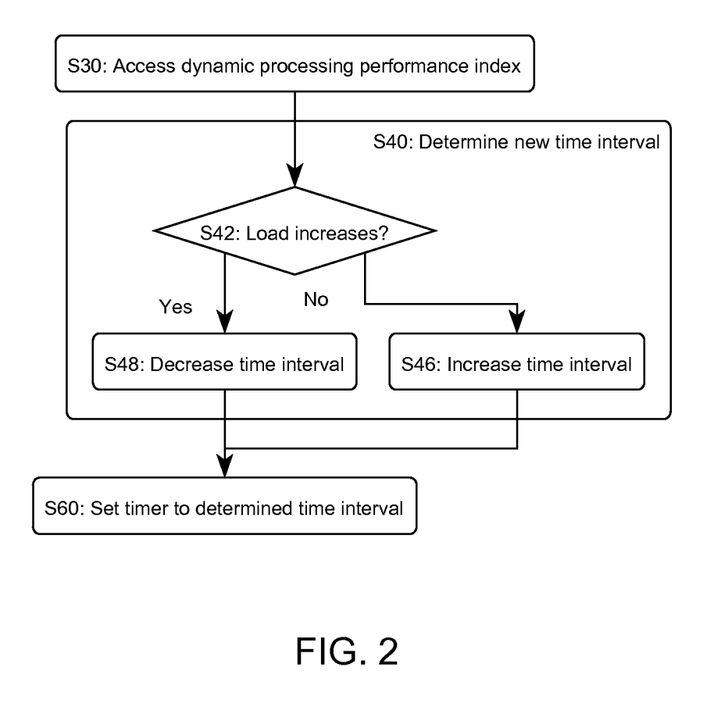
FIG. 2 is a flow chart illustrating a method dynamically adjusting block time intervals) in accordance with embodiments.

Referring now more particularly to FIG. 2, step S40 (time interval determination) is carried out to increase S46 (respectively decrease) a time interval if S42 a load of the processing elements 10 appears to decrease (respectively increase), as estimated from the accessed S30 performance index. For example, the relationship between the time interval $\beta$ and the job latency l used as performance index can be modeled as the product of the data arrival rate r, time interval and data processing cost k, i.e., $l = r \beta k$. Yet, a minimal time interval may be imposed, to avoid issues caused by task launching overheads. Similarly, a maximal time interval may be set, such that the dynamically changed time intervals may be bounded from above and from below.

Steps S30, S40 and S60 are implemented by a dedicated module or unit 30, hereafter called a "planner". Additional steps may subsequently be taken by other entities 70, 100, 10, as now explained referring back to FIG. 1. Namely, after a timer has been set to the last determined time interval, the receiver 70 takes care of grouping S70-S80 work items 52 that are being queued S52 (see FIG. 3 for an illustration) and, this, until S75 that time interval has elapsed, according to the timer set S60 from the planner 30. A block of grouped work items 52 is accordingly obtained S80, which can subsequently be passed S90 to the scheduler 100, for subsequent scheduling and processing by the processing elements 10.

Note that, here, "grouping" means aggregating, i.e., coalescing work items (e.g., tuples 52 as queued S52 in the tuple queue 54 in FIG. 3. Tuples 52 are aggregated in a synchronous fashion, as illustrated in FIG. 3, so as to maintain a synchronous treatment of incoming tuples and ease subsequent scheduling S100.

Steps S30, S40, S60 and S90 are typically carried out continuously (i.e., uninterruptedly), while streaming S52 work items 52 towards the receiver 70, whereby streamed work items 52 are queued S52 in view of pre-processing by the receiver 70.

Next, additional steps can be taken at the scheduler 100, where blocks 80 of work items 52 received from the receiver 70 are scheduled S100 for subsequent processing S10 (e.g., distributed processing, as assumed in embodiments) by the downstream processing elements 10.

Note that the obtained blocks are not directly passed S90 for scheduling. Rather, blocks 80 may be queued S88, as illustrated in FIG. 3, and the block queue is drained S90 every batch-period for subsequent scheduling S100, such that the scheduling process remains synchronous.

In that respect, an embodiment is one where live input data streams are received S50-S52 and then coalesced into dynamically adjusted S70-S80 blocks, which are then queued S88. The queue 90 is drained S90 every batch-period, thereby leading to jobs 110, which are scheduled S100 for processing, whereby jobs are queued in a job queue 120, before being actually processed S10.

In embodiments, multiple types of queries may be prioritized, in real-time, as evoked earlier. In addition to priority targets, latency targets encompassed in the queries may advantageously be taken into account. Namely, the work items 52 queued at step S52 may come from different types of queries S50. Such queries may have different priority and latency targets, a thing that may advantageously be taken into account by the planner 30. For instance, the latter may suitably instruct the scheduler, so as for blocks 80 to be scheduled S100 for subsequent processing according S85 to a type of query they are associated to.

For example, step S100 may comprise putting on hold or cancelling S45, S100 processing of blocks 80 that correspond to a type of query flagged as optional. Blocks may notably be cancelled or put on hold if S42 a load of the processing elements 10 was determined to have increased (or exceeded a given threshold), according to a last performance index as accessed at step S30.

In addition, time (block) intervals may further be adjusted S40 according to a processing performance target (e.g., a latency target) associated to the originating query, in addition to a latest performance index accessed S30. E.g., the block creation timers may be dynamically changed according to the effectively measured loads and latency targets of the queries. For example, using the previously presented model and a user provided target job latency l*, the time interval can be computed as: $\beta = l^*/(\hat{r}\hat{k})$, where $\hat{r}$ and $\hat{k}$ are the estimated data arrival rate (e.g., tuple rates) and data processing cost (e.g., per tuple processing time), respectively.

Referring now to FIGS. 3 and 4: according to another aspect, the invention may be embodied as a planner 30 or arbiter, for pre-processing work items 52. This planner 30 can typically be embodied as a module or unit, interfaceable with a receiver 70 such as described above. The planner 30 is configured to repeatedly perform steps S30, S40 and S60, as discussed earlier, while work items 52 are being queued for pre-processing by the receiver 70. An application is one where such a planner 30 is integrated in a Spark framework or a similar cluster framework.

Referring now more specifically to FIG. 4, the planner 30 may comprise an estimator 32, communicating with cluster nodes or an analytics platform for accessing performance indices S30 and adjust time intervals accordingly, thanks to a suitable model. In addition, the planner 30 may comprise a controller 34, communicating with the estimator 32 to receive updated estimations therefrom and accordingly setting timers (to newly adjusted time intervals). The controller 34 is otherwise communicating with the receiver 70, to enforce dynamic timers.

In embodiments where prioritizing queries is desired, the planner 30 may further comprise a load classifier 36, interfaced with both the controller 34 and the scheduler 100, e.g., for instructing the latter to put on hold or cancel S45, S100 processing of blocks 80 corresponding to optional queries.

Referring back to FIG. 3, the invention can further be embodied as a computerized system 1. The system 1 comprises a planner 30, a receiver 70, a scheduler 100 and processing elements 10 as described earlier. The planner 30 is interfaced with the receiver 70 and the scheduler 100 is interfaced with computerized processing elements 10, to schedule processing of blocks (as jobs).

As said earlier, the system 1 is configured to stream work items 52, so as for streamed work items 52 to get queued S52 for pre-processing by the receiver 70. Such a system 1 can for instance be embodied as a modified Spark system or a similar system.

The computerized system 1 may further comprise an analytics platform 30, configured to collect S20 indicators from the processing nodes 10 and estimate S25 performance indices based on such indicators.

Next, according to another aspect, the invention can be embodied as a computer program product, comprising a computer readable storage medium with program instructions embodied therewith, where program instructions are executable by one or more processors to execute steps for pre-processing work items, as described earlier. Such instructions may embody the function of the planner 30, as well as part or all of the functions of the receivers 70 and scheduler 100.

Thus, the present invention may be embodied as a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the C programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the present invention has been described with reference to a limited number of embodiments, variants and the accompanying drawings, it will be understood by those skilled in the art that various changes may be made and equivalents may be substituted without departing from the scope of the present invention. In particular, a feature (device-like or method-like) recited in a given embodiment, variant or shown in a drawing may be combined with or replace another feature in another embodiment, variant or drawing, without departing from the scope of the present invention. Various combinations of the features described in respect of any of the above embodiments or variants may accordingly be contemplated, that remain within the scope of the appended claims. In addition, many minor modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims. In addition, many other variants than explicitly touched above can be contemplated.

What is claimed is:

1. A computer-implemented method for pre-processing work items to be processed by computerized processing elements, the method comprising:

accessing, by a planner, a dynamic processing performance index of first work items as processed by the computerized processing elements;

determining, by the planner, according to the accessed performance index, a time interval length, wherein the time interval length is a length of time that a receiver groups queued second work items into a block;

setting, by the planner, a timer to the determined time interval length, to allow the receiver to group the queued second work items, so as to obtain the block to be passed to a scheduler for subsequent processing by computerized processing elements;

grouping, at the receiver and after a timer has been set to the determined time interval, the queued second work items until that time interval has elapsed, according to the timer set, to obtain a first block of grouped work items, and passing the obtained first block to a scheduler for subsequent processing of the block by the computerized processing elements; and scheduling a second block of grouped work items received, subsequent to the first block of grouped work items, from the receiver for distributed processing the computerized processing elements, wherein the first block of grouped work items and the second block of grouped work items received at the scheduler from the receiver are scheduled for distributed processing according to a type of query they are associated to.

2. The method of claim 1, wherein the accessed performance index measures a processing performance, by the computerized processing elements, of one or more blocks of work items as previously grouped by the receiver.

3. The method of claim 2, wherein the accessed processing performance index measures a processing latency and/or a processing throughput of the processed one or more blocks.

4. The method of claim 1, further comprising, prior to accessing the performance index, estimating the performance index based on indicators collected from the computerized processing elements.

5. The method of claim 1, wherein determining comprises increasing a time interval if, according to the accessed performance index, a load of the processing elements decreases or decreasing a time interval if, according to the accessed performance index, a load of the processing elements increases.

6. The method of claim 1, wherein accessing the performance index, determining a time interval, setting a timer to a determined time interval, and passing an obtained block are carried out while streaming said work items, whereby the streamed work items are queued in view of pre-processing by the receiver.

7. The method of claim 1, further comprising processing the several blocks and maintaining indicators for estimating the performance index.

8. The method of claim 1, wherein scheduling the several blocks comprises putting on hold or cancelling processing of blocks that correspond to a type of query that is flagged as optional.

9. The method of claim 8, wherein scheduling comprises putting on hold or cancelling processing of blocks that correspond to a type of query that is flagged as optional if a load of the processing elements has increased, according to the accessed performance index.

10. The method of claim 1, wherein the time interval during which the receiver may group queued work items into a block is determined according to both the accessed performance index and a processing performance target associated to the types of queries.

11. A planner for pre-processing work items to be processed by computerized processing elements, wherein the planner is interfaceable with a receiver and comprises a processor communicatively coupled to a memory, the processor configured, while work items are being queued for pre-processing by the receiver, to:
access a dynamic processing performance index of first work items as processed by the computerized processing elements;
determine, according to the accessed performance index, a time interval length, wherein the interval time length is a length of time that the receiver groups queued second work items into a block;
set a timer to the determined time interval length, to allow the receiver to group the queued second work items, to obtain the block to be passed to a scheduler for subsequent processing by computerized processing elements;
group, at the receiver and after a timer has been set to the determined time interval, the queued second work items until that time interval has elapsed, according to the timer set, to obtain a first block of grouped work items, and passing the obtained first block to a scheduler for subsequent processing of the block by the computerized processing elements; and
schedule a second block of grouped work items received, subsequent to the first block of grouped work items, from the receiver for distributed processing the computerized processing elements, wherein the first block of grouped work items and the second block of grouped work items received at the scheduler from the receiver are scheduled for distributed processing according to a type of query they are associated to.

12. The planner of claim 11, wherein the planner comprises an estimator for determining said time interval according to the accessed performance index; and a controller for setting the timer to the determined time interval.

13. The planner of claim 12, wherein the planner further comprises a load classifier for instructing the scheduler to put on hold or cancel processing of blocks corresponding to an optional query.

14. A computer program product for pre-processing work items to be processed by computerized processing elements, the computer program product comprising a computer readable storage medium having program instructions embodied therewith, the program instructions being executable by one or more processors to cause a planner interfaceable with a receiver, while work items are being queued in view of pre-processing by the receiver, to:
accessing a dynamic processing performance index of first work items as processed by the computerized processing elements;
determining, according to the accessed performance index, a time interval length, wherein the time interval length is a length of time that the receiver groups queued second work items into a block;
setting a timer to the determined time interval time length, to allow the receiver to group the second work items, so as to obtain the block to be passed to a scheduler for subsequent processing by computerized processing elements;
grouping, at the receiver and after a timer has been set to the determined time interval, the queued second work items until that time interval has elapsed, according to the timer set, to obtain a first block of grouped work items, and passing the obtained first block to a scheduler for subsequent processing of the block by the computerized processing elements; and
scheduling a second block of grouped work items received, subsequent to the first block of grouped work items, from the receiver for distributed processing the computerized processing elements, wherein the first block of grouped work items and the second block of grouped work items received at the scheduler from the receiver are scheduled for distributed processing according to a type of query they are associated to.

15. The computer program product of claim 14, wherein the accessed performance index measures a processing performance, by the computerized processing elements, of one or more blocks of work items as previously grouped by the receiver.

16. The computer program product of claim 15, wherein the accessed processing performance index measures a processing latency and/or a processing throughput of the processed one or more blocks.

17. The computer program product of claim 14, wherein determining comprises increasing a time interval if, according to the accessed performance index, a load of the processing elements decreases or decreasing a time interval if, according to the accessed performance index, a load of the processing elements increases.

* * * * *